United States Patent [19]

Aumann et al.

[11] Patent Number: 5,135,967
[45] Date of Patent: Aug. 4, 1992

[54] UNDERSEAL COMPOSITION, AND PROCESS FOR THE PRODUCTION THEREOF

[75] Inventors: Gerd Aumann, Alpen-Veen; Gerd Klatte, Rheinberg; Hans-Juergen Korte, Duesseldorf, all of Fed. Rep. of Germany

[73] Assignee: Deutsche Solvay-werke GmbH, Solingen, Fed. Rep. of Germany

[21] Appl. No.: 593,505

[22] Filed: Oct. 4, 1990

Related U.S. Application Data

[63] Continuation of Ser. No. 299,338, Jan. 23, 1989, abandoned.

[30] Foreign Application Priority Data

Jan. 21, 1988 [DE] Fed. Rep. of Germany ....... 3801649

[51] Int. Cl.$^5$ .............................................. C08K 9/04
[52] U.S. Cl. .................................... 523/210; 524/425; 524/427; 524/569
[58] Field of Search ................. 523/210; 524/425, 427

[56] References Cited

U.S. PATENT DOCUMENTS 4,013,603  3/1977  Zavatti et al. ................... 524/59

FOREIGN PATENT DOCUMENTS 55-165960  12/1980  Japan .................................. 524/425
62-007784   1/1987  Japan .................................. 524/425

*Primary Examiner*—John C. Bleutge
*Assistant Examiner*—Mark Sweet
*Attorney, Agent, or Firm*—Foley & Lardner

[57] ABSTRACT

The present invention relates to an underseal composition for motor vehicles, comprising a finely divided vinyl chloride homopolymer, copolymer, terpolymer or graft polymer, a plasticizer, a stabilizer, and a filler comprising calcium carbonate particles, wherein at least a part of said filler is provided with a surface coating formed by a surface treatment agent which comprises at least one saturated or unsaturated carboxylic acid, fatty acid or substituted fatty acid, said carboxylic acid or fatty acid having from 2 to 32 carbon atoms and containing at least one polar group in addition to at least one —COOH group, or a salt of said carboxylic acid or fatty acid. The underseal composition has improved rheological properties.

36 Claims, No Drawings

UNDERSEAL COMPOSITION, AND PROCESS FOR THE PRODUCTION THEREOF

This application is a continuation of application Ser. No. 07/299,338, filed Jan. 23, 1989, now abandoned.

BACKGROUND OF THE INVENTION

The present invention relates to an underseal composition for motor vehicles.

Metal-coating agents or metal-coating compositions based on polyvinyl chloride, plasticizers, pigments and/or fillers, such as chalk, have already been disclosed (cf., inter alia, German Auslegeschrift 1,229,220). It has furthermore been disclosed that the processability in certain areas of application, for example the coating of metals, is accompanied by difficulties inasmuch as requirements such as adhesive strength, in addition to good processability, must be satisfied.

Even greater demands are made on underseal compositions for motor vehicles, for example based on polyvinyl chloride, since the underseal compositions must not only be easy to apply, have good adhesion and the like, but must also have a certain resistance to chipping and other mechanical influences. It has therefore been shown that numerous plastisols, which can be employed, for example, for the coating of paper, for the production of wallpaper, for the production of floor coverings, for sheathing cables and so on, are not suitable as underseal agents or compositions.

SUMMARY OF THE INVENTION

Accordingly, it is an object of the present invention to provide an underseal composition based on polyvinyl chloride which has improved rheological properties, including good flowability during application or during spraying.

Another object of the present invention is to provide an underseal composition which has good non-sag properties after application and good adhesion to the substrate without significant impairment of the other properties of the underseal agent.

In accomplishing the foregoing objectives, there has been provided, in accordance with one aspect of the present invention, an underseal composition for motor vehicles, comprising (a) a finely divided vinyl choride homopolymer, copolymer, terpolymer or graft polymer,
(b) a plasticizer,
(c) a stabilizer, and
(d) a filler comprising calcium carbonate particles, wherein at least a part of said filler is provided with a surface coating formed by a surface treatment agent which comprises at least one saturated or unsaturated carboxylic acid, fatty acid or substituted fatty acid, said carboxylic acid or fatty acid having from 2 to 32 carbon atoms and containing at least one polar group in addition to at least one —COOH group, or a salt of said carboxylic acid or fatty acid. The composition may further comprise an adhesion promoter, a dye or colored pigment, and a solvent or diluent.

In a preferred embodiment, said surface treatment agent comprises an aliphatic saturated or unsaturated monocarboxylic acid or fatty acid comprising at least one hydroxyl, carbonyl, ether or amino group, or a salt of said monocarboxylic acid.

In accordance with another aspect of the present invention there is provided a process for producing an underseal composition for motor vehicles, comprising the steps of (a) applying to the surfaces of calcium carbonate particles, at a temperature of from about 278° to 368° K, a solution, emulsion, or suspension, which comprises at least one diluent or solvent and a surface treatment agent which comprises at least one saturated or unsaturated carboxylic acid, dicarboxylic acid, fatty acid or substituted fatty acid containing at least one polar group in addition to at least one -COOH group, or a salt of said carboxylic acid or fatty acid, (b) filtering the treated calcium carbonate particles,
(c) drying and grinding said calcium carbonate particles,
(d) forming a filler comprising said treated calcium carbonate particles, and
(e) combining said filler with
(i) a finely divided vinyl chloride homopolymer, copolymer, terpolymer or graft polymer,
(ii) a plasticizer, and
(iii) a stabilizer.

The filler may be further combined with an adhesion promoter, a dye or pigment, and a solvent or diluent.

In accordance with another aspect of the present invention, there is provided a method of use of calcium carbonate particles treated with surface treatment agents as recited above, such that the surface coating comprises polar alkaline metal salts, fatty acid alkaline earth metal salts or carboxylates thereof, for controlling the rheology of underseal compositions.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

Calcium carbonate particles which have been surface-treated with the above-mentioned chemical compounds are preferably employed in underseal compositions, which are subsequently ground, in particular in order to separate agglomerates which have formed. The calcium carbonate preferably has a mean particle size of from 0.01 $\mu$m to 20 $\mu$m, particularly preferably 0.05 $\mu$m to 5 $\mu$m. The calcium carbonate is preferably a synthetic calcium carbonate. The calcium carbonate employed has a specific surface area (BET, adsorption using nitrogen) of from 0.5 to 100 m$^2$/g, preferably 1 to 50 m$^2$/g. It is preferably present as a filler in the underseal composition, alone or mixed with other fillers.

According to a preferred embodiment, a dicarboxylic acid or an alkali salt of a dicarboxylic acid, preferably an ammonium salt of a dicarboxylic acid, is employed as the carboxylic acid containing polar groups, whereby the additional polar group is the carboxylic acid group or a carboxylate group, preferably an ammonium carboxylate group. Carboxylic acids having two carboxylic acid groups or carboxylate groups, preferably ammonium carboxylate groups, in combination with at least one hydroxyl, carbonyl, carboxyl, ether and/or amino group, are also preferably employed.

According to a preferred embodiment, up to 70% by weight (based on 100 parts by weight of the carboxylic acids containing polar groups and employed for the surface treatment), preferably up to 50% by weight, of the carboxylic acid or carboxylic acids, fatty acid, substituted fatty acid or alkali salt of the carboxylic acid, or a mixture thereof (preferably the ammonium salt of the carboxylic acid(s)), containing at least one further polar group, are replaced by a saturated and/or unsaturated monocarboxylic acid containing no further polar groups besides the carboxyl or carboxylate groups, the alkali salts thereof, preferably the ammonium salt, having $C_2$–$C_{32}$, and/or humic acid or an alkali salt thereof, preferably an ammonium salt.

According to a preferred embodiment, the underseal composition comprises about 10 to 60 parts by weight, preferably 25 to 45 parts by weight, of a vinyl chloride homopolymer, copolymer or terpolymer, about 10 to 60 parts by weight, preferably 20 to 45 parts by weight, of a plasticizer or plasticizer mixture, about 12 to 1 parts by weight, preferably 6 to 2 parts by weight, of at least one dye or colored pigment, of an additive and/or a processing auxiliary or added agent, preferably of an adhesion promoter and/or stabilizer, about 10 to 60 parts by weight, preferably 15 to 40 parts by weight, of at least one filler, preferably of a surface-treated calcium carbonate or of a surface-treated filler mixture comprising calcium carbonate. The calcium carbonate or the calcium carbonate present in the filler mixture is provided with about 0.3 to 12% by weight, preferably 1 to 5% by weight (based on 100 parts by weight of the surface-treated calcium carbonate or of the surface-treated filler mixture, preferably of the calcium carbonate present therein), of at least one saturated and/or unsaturated carboxylic acid, fatty acid or substituted fatty acid containing at least one polar group besides at least one —COOH group or a salt of this compound or fatty acid derivative. The calcium carbonate is particularly preferably provided with at least one hydroxyl, carbonyl, carboxyl, ether and/or amino group-containing, saturated and/or unsaturated aliphatic monocarboxylic acid, fatty acid or dicarboxylic acid, or at least one salt of this monocarboxylic acid containing at least one polar group and having $C_2$ to $C_{32}$, preferably $C_{10}$ to $C_{22}$. The aforementioned components are arranged on the surface or on part of the surface of the filler or filler mixture, preferably the surface of the calcium carbonate.

Vinyl chloride homopolymers, copolymers, terpolymers and/or graft polymers which are known per se and can be made into a paste, or mixtures of polyvinyl chloride which can be made into a paste, are employed for the underseal composition according to the invention. As vinyl chloride homopolymers, copolymers or terpolymers which can be made into a paste, finely divided suspension, emulsion or graft polymers, but preferably emulsion homopolymers, copolymers and/or terpolymers, can be employed. The vinyl chloride copolymers or terpolymers employed are vinyl chloride copolymers or terpolymers which are known per se and contain more than 50% by weight, preferably more than 80% by weight, of polyvinyl chloride or vinyl chloride (based on 100 parts by weight of the copolymer or terpolymer), preferably vinyl chloride/acrylate, vinyl chloride/methacrylate, vinyl chloride/vinyl acetate copolymers. However, copolymers having a vinyl chloride content of greater than about 90% by weight, preferably greater than 95% by weight, are preferably employed. The underseal composition is produced with concomitant use of commercially available mixers or paste mixers, for example slow mixers (kneaders) or high-speed mixers (dissolvers).

Suitable plasticizers are the plasticizers or plasticizer mixtures which are known per se, preferably alkyl, aryl or aralkyl phthalates, preferably alkyl phthalates having a chain length of $C_7$–$C_{11}$, adipates and sebacates.

A small proportion, for example up to about 10 parts by weight, preferably 0 to 5 parts by weight (based on the proportion by weight of the plasticizer) of the plasticizers can be replaced by the same amount of an organic solvent.

According to a preferred embodiment, the surface layer or the surface-treatment agent of the filler or filler mixture present in the underseal composition, preferably of the calcium carbonate or of the calcium carbonate-containing filler mixture, comprises about 0.01 to 20% by weight, preferably 0.1 to 6% by weight, of at least one unsaturated carboxylic acid, dicarboxylic acid, fatty acid or substituted fatty acid containing no polar groups or at least one polar group besides at least one —COOH group, or a salt of this compound or fatty acid derivative, preferably at least one unsaturated aliphatic monocarboxylic acid containing hydroxyl, carbonyl, carboxyl, amino and/or ether groups, or at least one salt of this monocarboxylic acid containing at least one polar group (in total based on 100 parts by weight of the aliphatic carboxylic acid, fatty acid, substituted fatty acid, fatty acid salt or fatty acid derivative employed) and about 99.9 to 80% by weight, preferably 99.9 to 94% by weight, of at least one saturated carboxylic acid, dicarboxylic acid, fatty acid or substituted fatty acid containing at least one polar group besides at least one —COOH group, or a salt of this compound or fatty acid derivative, preferably at least one saturated aliphatic monocarboxylic acid containing hydroxyl, carbonyl, carboxyl, amino and/or ether groups, or at least one salt of this monocarboxylic acid containing at least one polar group.

According to this preferred embodiment, improved application of the surface-treatment agent is achieved by means of a small proportion of unsaturated acids, substituted fatty acids or fatty acid salts containing no additional polar groups or at least one additional polar group.

Additional fillers of the filler mixture which can be employed besides calcium carbonate (synthetic and/or natural calcium carbonate) are, inter alia, dolomite, talc, (including microtal(c), silica and/or quartz powder.

According to a preferred embodiment, the underseal composition additionally comprises very small amounts of an alkaline earth metal hydroxide and/or an alkaline earth metal oxide, preferably calcium oxide.

According to a preferred embodiment, the surface-treatment agent for the filler or the filler mixture, preferably for the calcium carbonate, comprises an alkali metal salt or ammonium salt of a saturated carboxylic acid, fatty acid or substituted fatty acid containing at least one hydroxyl group, preferably an alkali metal salt or ammonium salt of a fatty acid or substituted fatty acid containing at least one hydroxyl group.

As organic carboxylic acids containing polar groups, saturated and/or unsaturated monocarboxylic acids, dicarboxylic acids or polycarboxylic acids, the derivatives thereof, substituted compounds and/or salts are employed, but preferably those which contain one or more hydroxyl, amino, carbonyl, carboxyl and/or ether groups, and salts of the monocarboxylic acids, preferably fatty acids.

Alkali metal salts and/or ammonium salts of the corresponding fatty acids having additional polar groups and having $C_2$ and $C_{32}$, preferably $C_{10}$ to $C_{22}$ which comprise saturated fatty acid containing at least one additional polar group, or comprise up to about 20% by weight, preferably up to 6% by weight, of an unsaturated fatty acid optionally containing at least one additional polar group are preferably employed. The ammonium salts of the fatty acids containing polar groups, preferably fatty acids containing hydroxyl groups or fatty acids containing amino groups, preferably hydroxystearic acid, hydroxpalmitic acid, hydroxyoleic acid, aminostearic acid, aminolinoleic acid and/or the alkali salts, preferably the ammonium salts, of this compound, are preferably employed.

According to a preferred embodiment, a synthetic surface-coated calcium carbonate is present in the underseal composition, preferably prepared by introducing carbon dioxide into a calcium hydroxide suspension and subsequently surface-treating the calcium carbonate prepared with an alkali salt or ammonium salt of a saturated or unsaturated carboxylic acid, dicarboxylic acid, fatty acid or substituted fatty acid containing at least one polar group, preferably with an alkali salt or ammonium salt of an aliphatic monocarboxylic acid or fatty acid containing at least one hydroxyl, carbonyl, amino and/or ether group. During the surface treatment here, all or some of the corresponding calcium compound of these fatty acids containing polar groups is formed on the surface of the calcium carbonate.

The surface layer formed on the surface of the synthetic calcium carbonate after application of the treatment agent preferably comprises a calcium salt and/or alkali metal salt, and also, if appropriate, an ammonium salt, of at least one fatty acid containing at least one hydroxyl group and having $C_{10}$ to $C_{22}$, preferably 12-hydroxystearic acid.

The invention furthermore relates to a process for the production of an underseal composition for motor vehicles, where the components, comprising at least one finely divided vinyl chloride homopolymer, copolymer, terpolymer or graft polymer, at least one plasticizer, at least one stabilizer, at least one filler based on calcium carbonate or a calcium carbonate-containing filler mixture, and at least one adhesion promoter and/or one other auxiliary or added substance, and also, if appropriate, a dye, a colored pigment, a solvent and/or a diluent, are mixed with one another. According to the invention, the calcium carbonate, (preferably the synthetic calcium carbonate,) is mixed and treated, before addition to the underseal composition or to one or more component(s) of the underseal composition, with a solution, emulsion or suspension, containing at least one diluent or solvent, of a surface-treatment agent in the form of a saturated and/or unsaturated carboxylic acid, dicarboxylic acid, fatty acid or substituted fatty acid containing at least one polar group besides at least one —COOH group, or a salt of these compounds or fatty acid derivatives, preferably at least one saturated and/or unsaturated aliphatic monocarboxylic acid or fatty acid containing at least one hydroxyl, carbonyl, carboxyl, ether and/or amino group, or at least one salt of this monocarboxylic acid containing polar and non-polar groups and having $C_2$ to $C_{22}$, at temperatures of from 278° K. to 368° K., preferably 328° K. to 358° K. After the impregnation, the calcium carbonate with the surface layer formed on the surface is filtered off and treated, preferably dried and ground.

Surprisingly, it has been found that the filtrate has a significantly lower carboxylic acid or fatty acid content than when a carboxylic acid or fatty acid containing no polar groups, or salts thereof, is used.

According to a preferred embodiment, the carboxylic acid containing polar groups, preferably the fatty acid, salts of the fatty acid and/or substituted fatty acid, is added to an aqueous calcium carbonate suspension, which has preferably been prepared synthetically (precipitated calcium carbonate).

According to a preferred embodiment, the surface-treatment agent is added in the form of an aqueous emulsion to the aqueous calcium carbonate suspension. In a preferred embodiment, the surface-treatment agent is added in the form of its salts, preferably alkali metal salts and/or ammonium salts, to the calcium carbonate, preferably the calcium carbonate suspension, for surface treatment.

According to a preferred embodiment, the surface-treatment agent is employed in the form of the ammonium salt. All or some of the ammonium salt of the surface-treatment agent containing polar groups react with the calcium carbonate on the surface of the calcium carbonate particles, so that all or some of the corresponding calcium salts of the surface-treatment agent form on the surface of the calcium carbonate particles, and all or some of the resultant ammonium compounds volatilize during the reaction at the process temperature.

The invention furthermore relates to the use of a calcium carbonate or calcium carbonate-containing filler mixture which, through treatment with a surface-coating agent based on a saturated and/or unsaturated carboxylic acid, dicarboxylic acid, fatty acid or substituted fatty acid containing at least one polar group besides at least one —COOH group, or a salt of this compound or fatty acid derivative, preferably at least one saturated and/or unsaturated aliphatic monocarboxylic acid or fatty acid containing at least one hydroxyl, carbonyl, carboxyl, ether and/or amino group, or at least one salt of the monocarboxylic acid containing polar groups, and having $C_2$ to $C_{32}$, preferably $C_{10}$ to $C_{22}$, produces a surface coating or surface conversion on part or all of the surface of the calcium carbonate, so that the surface coating comprises polar alkali metal salts and/or fatty acid alkaline earth metal salts or carboxylates thereof, for controlling the rheology of underseal compositions.

Underseal compositions are generally applied by spraying; the pump pressures used during this operation are very high since the plastisol must be forced out of the storage tank into the delivery lines and then through the nozzle of the spray head, the latter taking place at high speed. High structural viscosities are therefore desirable, i.e. the viscosity is low at high shear rate gradients. After application of the underseal composition to the metal sheeting, it must not flow off or drip off vertical areas, i.e. it must have a high sag resistance, which can be described, inter alia, by measuring the rheology and determining a flow limit. The surface treatment of the calcium carbonate results in a preferred rheology inasmuch as the flow limit increases more quickly relative to the viscosity at high shear rate gradients than is the case, for example, for non-surface-treated calcium carbonates.

EXAMPLES OF THE UNDERSEAL COMPOSITION ACCORDING TO THE INVENTION

Example 1

| | |
|---|---|
| Vinyl chloride homopolymer (paste type) | 70 parts by weight |
| Polyvinyl chloride (microsuspension type) | 30 parts by weight |
| Diethylhexyl phthalate | 55 parts by weight |
| Diisononyl phthalate | 60 parts by weight |
| Calcium carbonate, surface-treated with the ammonium salt of 12-hydroxystearic acid | 70 parts by weight |
| Basic lead sulfate | 2 parts by weight |
| Polyaminoamide | 4 parts by weight |
| Calcium oxide | 5 parts by weight |

EXAMPLE 2

| | |
|---|---|
| Vinyl chloride homopolymer (paste type) | 30 parts by weight |
| Vinyl chloride copolymer | 40 parts by weight |
| Polyvinyl chloride (microsuspension type) | 30 parts by weight |
| Diethylhexyl phthalate | 50 parts by weight |
| Diisononyl phthalate | 65 parts by weight |
| Calcium carbonate, surface-treated with the ammonium salt of 12-hydroxystearic acid | 70 parts by weight |
| Basic lead sulfate | 2 parts by weight |
| Polyaminoamide | 3 parts by weight |
| Calcium oxide | 5 parts by weight |

The components of the underseal compositions of Examples 1 and 2 (each separately) were mixed and homogenized by means of dissolvers. The underseal compositions produced were tested using a rotation viscosimeter in order to determine the rheological properties. Evaluation of the measurement curves showed a significantly increased flow limit, evaluated by the Bingham method, at a relatively low viscosity at a high shear rate gradient. This means that the underseal composition is easier to pump, due to the high structural viscosity (high structural viscosity is a somewhat low viscosity at a high shear rate gradient), but at the same time does not flow or drip off after application due to the relatively high flow limit. This property profile was hitherto not achievable with other fillers, modified or not.

In addition, the underseal compositions were tested for sag resistance (groove in accordance with DIN 52 454 - St - U 26 - 50); excellent sag resistance was found using all methods. All the other requirements of an underseal composition were likewise satisfied (gelling conditions, adhesion).

Preparation of the surface-treated calcium carbonate:

The calcium carbonate surface-treated according to the invention was prepared in the manner described below:

The calcium carbonate was precipitated by passing carbon dioxide into an aqueous suspension of 150 g of calcium hydroxide per liter. The final reaction temperature was 70° C. The subsequent surface-treatment was carried out by adding an aqueous emulsion, likewise warmed to 70° C., of 12-hydroxystearic acid, in the form of the ammonium salt. The amount added was selected so that a surface-treatment quantity of 30 g/kg of calcium carbonate resulted. After vigorous stirring, the suspension was filtered, and the surface-coated calcium carbonate obtained was dried at 105° C. and subsequently ground.

EXAMPLE 3

Composition as in Example 1. However, the calcium carbonate was surface-treated with the ammonium salt of glutamic acid.

EXAMPLE 4

Composition as in Example 1. However, the calcium carbonate was surface-treated with a mixture of the ammonium salts of 12-hydroxystearic acid and humic acid in the weight ratio 1 : 1.

EXAMPLE 5

Composition as in Example 1. However, the calcium carbonate was surface-treated with the ammonium salt of 3,6,9-trioxaundecanedioic acid.

EXAMPLE 6

Composition as in Example 1. However, the calcium carbonate was surface-treated with the ammonium salt of pyruvic acid.

EXAMPLE 7

Composition as in Example 2. However, the calcium carbonate was surface-treated with a mixture comprising the ammonium salt of 12-hydroxystearic acid and high-purity stearic acid in the weight ratio

COMPARATIVE EXAMPLE 8

Composition as in Example 1. However, the calcium carbonate was surface-treated with fatty acid (technical grade), namely mixtures of stearic, palmitic and oleic acid (ST Edenor 20).

The flow limits and viscosities determined for Examples 1, 3, 4, 5 and 6 and for Comparative Example 8 can be seen from the table.

| Example | Substances for surface treatment in the form of the ammonium salts of the following carboxylic acids: | Flow limit (Pa) | Viscosity (Pa · s) |
|---|---|---|---|
| 1 | 12-Hydroxystearic acid | 229 | 23.1 |
| 3 | Glutamic acid | 262 | 22 |
| 4 | Humic acid/12 hydroxystearic | 365 | 30.7 |
| 5 | 3,6,9-trioxaundecanedioic acid | 274 | 16.8 |
| 6 | Pyruvic acid | 308 | 24.4 |
| 8 | Fatty acid (technical grade) | 81 | 8.0 |

What is claimed is:

1. An underseal composition for motor vehicles, comprising
   (a) about 10 to 60 parts by weight of a finely divided vinyl chloride homopolymer, copolymer, terpolymer or graft polymer,
   (b) about 10 to 60 parts by weight of at least one plasticizer or plasticizer mixture,
   (c) about 1 to 12 parts by weight of at least one additive selected form the group consisting of a dye, a colored pigment, an adhesion promoter and a stabilizer, and
   (d) about 10 to 60 parts by weight of a filler comprising calcium carbonate particles, wherein at least a part of the surface of the calcium carbonate particles of said filler is provided with a surface coating, in an amount of about 0.3 to 12% by weight, based on the total weight of said filler, which comprises a surface treatment agent comprising at least one saturated or unsaturated monocarboxylic acid or dicarboxylic acid containing from 2 to 32 carbon atoms, or a salt of said acid, wherein said acid contains at least one additional polar group selected from the group consisting of hydroxyl and amino.

2. An underseal composition as claimed in claim 1, wherein said acid contains from 10 to 22 carbon atoms.

3. An underseal composition as claimed in claim 1, wherein said polar group is a hydroxyl group.

4. An underseal composition as claimed in claim 3, wherein said acid is hydroxystearic acid, hydroxypalmitic acid, hydroxyoleic acid or a salt thereof.

5. An underseal composition as claimed in claim 4, wherein said acid is 12-hydroxystearic acid.

6. An underseal composition as claimed in claim 1, wherein said acid is aminostearic acid, aminolinoleic acid or a salt thereof.

7. An underseal composition as claimed in claim 1, wherein said salt is an alkali metal salt or an ammonium salt.

8. An underseal composition as claimed in claim 1, wherein said surface coating is rpesent in an amount of 1 to 5% by weight, based on the total weight of the calcium carbonate particles of said filler.

9. A composition as claimed in claim 1 comprising from 15 to 40 parts by weight of said filler.

10. A composition as claimed in claim 1 comprising from 20 to 45 parts by weight of said at least one plasticizer or plasticizer mixture.

11. A composition as claimed in claim 1 comprising from 25 to 45 parts by weight of said vinyl chloride homopolymer, copolymer, terpolymer or graft polymer.

12. A composition as claimed in claim 1 comprising from 2 to 6 parts by weight of said at least one additive.

13. A composition as claimed in claim 1, wherein said calcium carbonate particles have a mean particle size of about 0.01 to 20 µm before treatment.

14. A composition as claimed in claim 13, wherein said calcium carbonate particles have a mean particle size of about 0.05 to 5 µm.

15. A composition as claimed in claim 1, further comprising a solvent or diluent.

16. A composition as claimed in claim 1, wherein said calcium carbonate particles have a specific surface area before treatment (BET, adsorption using nitrogen) of about 0.5 to 100 m²/g.

17. A composition as claimed in claim 16, wherein said calcium carbonate particles have a specific surface area of 1 to 50 m²/g.

18. An underseal composition for motor vehicles, comprising
(a) about 10 to 60 parts by weight of a finely divided vinyl chloride homopolymer, copolymer, terpolymer or graft polymer,
(b) about 10 to 60 parts by weight of at least one plasticizer or plasticizer mixture,
(c) about 1 to 12 parts by weight of at least one additive selected form the group consisting of a dye, a colored pigment, an adhesion promoter and a stabilizer, and
(d) about 10 to 60 parts by weight of a filler comprising calcium carbonate particles, wherein at least a part of the surface of the calcium carbonate particles of said filler is provided with a surface coating, in an amount of about 0.3 to 12% by weight, based on the total weight of said filler, which comprises a surface treatment agent comprising
(a) from about 0.01 to 20 parts by weight of at least one unsaturated monocarboxylic acid or dicarboxylic acid containing from 2 to 32 carbon atoms and containing no additional polar groups or at least one additional polar group, or a salt of said unsaturated acid, and
(b) from about 80 to 99.99 parts by weight of at least one saturated monocarboxylic acid or dicarboxylic acid containing from 2 to 32 carbon atoms and containing at least one additional polar group, or a salt of said saturated acid, based on 100 parts by weight of the total amount of acids or salts thereof employed.

19. A composition as claimed in claim 18, comprising from 0.1 to 6 parts by weight of said at least one unsaturated acid or salt thereof and from 94 to 99.9 parts by weight of said at least one saturated acid or salt thereof.

20. A composition as claimed in claim 18, wherein said unsaturated acid is an aliphatic monocarboxylic acid or dicarboyxlic acid containing at least one hydroxul carbonyl, amino, ether or additional carboxyl group, or a salt of said unsaturated acid.

21. A composition as claimed in claim 18, wherein said saturated compound is an aliphatic monocarboxylic acid or dicarboxylic acid containing at least one hydroxyl, carbonyl, amino, ether or additional carboxyl group, or a salt of said saturated acid.

22. A composition as claimed in claim 1, wherein said filler comprises a synthetic surface-coated calcium carbonate.

23. A composition as claimed in claim 22, wherein said calcium carbonate is formed by passing carbon dioxide into a calcium hydroxide suspension and subsequently surface-treated with an alkali metal salt or ammonium salt of a saturated or unsaturated monocarboxylic acid or dicarboxylic acid containing at least one additional polar group.

24. A composition as claimed in claim 1, wherein said surface coating comprises a calicum salt or an alkali metal salt of at least one fatty acid which contains from 10 to 22 carbon atoms and at least one hydroxyl group.

25. A composition as claimed in claim 24, further comprising an ammonium salt of said fatty acid.

26. A composition as claimed in claim 24, wherein said fatty acid is 12-hydroxystearic acid.

27. A composition as claimed in claim 1, wherein said monocarboxylic acid or dicarboxylic acid contains one additional polar group.

28. An underseal composition for motor vehicles, comprising
(a) a finely divided vinyl choride homopolymer, copolymer, terpolymer or graft polymer,
(b) a plasticizer,
(c) a stabilizer, and
(d) a filler comprising calcium carbonate particles, wherein at least a part of the surface of said filler is provided with a surface coating comprising a surface treatment agent which comprises at least one saturated or unsaturated carboxylic acid containing from 2 to 32 carbon atoms, or a salt of said acid, wherein said acid contains at least one additional polar group selected from the group consisting of hydroxyl and amino.

29. An underseal composition as claimed in claim 28, wherein said acid contains from 10 to 22 carbon atoms.

30. An underseal composition as claimed in claim 28, wherein said acid is a saturated or unsaturated monocarboxylic or dicarboxylic acid.

31. An underseal composition as claimed in claim 28, wherien said acid is an unsubstituted or substituted fatty acid.

32. An underseal composition as claimed in claim 28, wherein said acid contains one additional polar group.

33. An underseal composition as claimed in claim 28, wherein said polar group is a hydroxyl group.

34. An underseal composition as claimed in claim 33, wherein said acid is hydroxystearic acid, hydroxypalmitic acid, hydroxyoleic acid or a salt thereof.

35. An underseal composition as claimed in claim 34, wherein said acid is 12-hydroxystearic acid.

36. An underseal composition as claimed in claim 28, wherein said acid is aminostearic acid, aminolinoleic acid or a salt thereof.

* * * * *